United States Patent [19]

Herrigel

[11] Patent Number: 4,618,429
[45] Date of Patent: Oct. 21, 1986

[54] METHOD OF MAINTAINING ADEQUATE SEED CRYSTAL IN PREFERENTIAL PRECIPITATION SYSTEMS

[75] Inventor: Howard R. Herrigel, Seattle, Wash.

[73] Assignee: Resources Conservation Co., Bellevue, Wash.

[21] Appl. No.: 682,441

[22] Filed: Dec. 14, 1984

Related U.S. Application Data

[63] Continuation-in-part of Ser. No. 678,900, Dec. 6, 1984.

[51] Int. Cl.$^4$ ............................................. B01D 13/00
[52] U.S. Cl. ..................................... 210/652; 210/714
[58] Field of Search .................. 23/295 R, 295 S, 296, 23/298, 300, 301, 302 R, 302 A, 302 T, 303, 304; 210/714, 715, 652

[56] References Cited

U.S. PATENT DOCUMENTS

4,207,183   6/1980   Herrigel .............................. 210/714

Primary Examiner—Frank Sever
Attorney, Agent, or Firm—Seed and Berry

[57] ABSTRACT

A method for ensuring an adequate amount of seed crystal in solution concentration systems employing preferential precipitation to control scaling and fouling over relatively low concentration factors. In systems concentrating solutions at concentration factors between 1 and 2, the method comprises determining the minimum amount of seed crystal necessary for the solution being concentrated at a concentration factor of about 10 or greater and introducing into the feeds solution a percentage of this amount according to the equation, % introduced $= 25 \times (C.F.) \times (C.F._{MAX}/C.F._{MAX} - 1)$.

24 Claims, 9 Drawing Figures

| STREAM | FLOW VOLUME, ARBITRARY UNITS | C.F. | SEED LEVEL % * |
|---|---|---|---|
| 1 | 100 | 1 | 0 |
| 2 | SOLID OR CONCENTRATED SLURRY | — | — |
| 3 | 100 | 1 | 27.78 |
| 4 | 50 | — | 0 |
| 5 | 50 | 2 | 65.56+ |

\# FEED ASSUMED SATURATED.
\* RELATIVE TO SEED LEVEL REQUIRED AT $CF_{MAX}$.
+ INCLUDES 10% FROM PRECIPITATED SOLIDS, $CF_{MAX} = 10$ ASSUMED.

FIG. 4B

| STREAM | FLOW VOLUME, ARBITRARY UNITS | C.F. | SEED LEVEL % * |
|---|---|---|---|
| 1 | 100 | 1 | 0 |
| 2 | SOLID OR CONCENTRATED SLURRY | — | — |
| 3 | 100 | 1 | 27.78 |
| 4 | 50 | — | 0 |
| 5 | 50 | 2 | 65.56+ |
| 6 | 50 | 2 | 10++ |

\# FEED ASSUMED SATURATED.
\* RELATIVE TO REQUIRED SEED LEVEL AT $CF_{MAX}$.
+ INCLUDES 10% FROM PRECIPITATED SOLIDS, $CF_{MAX} = 10$ ASSUMED.
++ FROM PRECIPITATED SOLIDS, $CF_{MAX} = 10$ ASSUMED.

FIG. 4C

| STREAM | FLOW VOLUME, ARBITRARY UNITS | C.F. | SEED LEVEL %* |
|---|---|---|---|
| 1 | 100 | 1 | 0 |
| 2 | SOLID OR CONCENTRATED SLURRY | — | — |
| 3 | 100 | 1 | 27.78 |
| 4 | 80 | — | 0 |
| 5 | 20 | 5 | 178.9 + |
| 6 | 20 | 5 | 40 ++ |

\# FEED ASSUMED SATURATED.
☆ RELATIVE TO REQUIRED SEED LEVEL AT $CF_{MAX}$
+ INCLUDES 40% FROM PRECIPITATED SOLIDS, $CF_{MAX} = 10$ ASSUMED.
++ FROM PRECIPITATED SOLIDS, $CF_{MAX} = 10$ ASSUMED

FIG. 5

| STREAM | FLOW VOLUME, ARBITRARY UNITS | C.F. | SEED LEVEL %* |
|---|---|---|---|
| 1 | 100 | 1 | 0 |
| 2 | 294 | 1.67° | 55.84 |
| 3 | 394 | 1.50° | 41.67 |
| 4 | 40 | — | 0 |
| 5 | 354 | 1.67° | 47.50 + |
| 6 | 60 | 1.67° | 6.68 ++ |

☆ RELATIVE TO SEED LEVEL REQUIRED AT $CF_{MAX}$.
+ INCLUDES PRECIPITATED SOLIDS, $CF_{MAX} = 10$ ASSUMED.
++ PRECIPITATED SOLIDS, $CF_{MAX} = 10$ ASSUMED.
° CF RELATIVE TO ORIGINAL FEED.

FIG. 6B

METHOD OF MAINTAINING ADEQUATE SEED CRYSTAL IN PREFERENTIAL PRECIPITATION SYSTEMS

This application is a continuation in part application of Ser. No. 678,900, filed Dec. 6, 1984.

BACKGROUND OF THE INVENTION

1. Field of Invention

This invention relates generally to the field of solution concentration, and more particularly concerns reverse osmosis systems, electrodialysis systems, brine concentrators, evaporators, desalinators and other systems that use preferential precipitation to control scaling and fouling.

2. Description of the Prior Art

It is known that relatively pure solvent can be removed from a solution by reverse osmosis (R.O.) wherein solvent is extracted by pressurizing a solution against a semi-permeable membrane that allows solvent to pass while obstructing the passage of solutes. For example, fresh water can be extracted from a brine solution by pressurizing the solution against an aromatic polyamide or cellulose acetate membrane that allows water to pass, but not salt. In this manner, solvents can be extracted from solutions, and the remaining solutes can be concentrated.

Evaporators and distillation systems are also used to purify solvents or concentrate solutes, though in a substantially different manner. In these systems, a solution is usually heated on a heat transfer surface and solvent is driven off by evaporation. If the object is to capture purified solvent, then the solvent vapors are condensed and retained. If the object is to capture or concentrate dissolved salts or suspended particles, then retaining condensed solvent vapors may not be essential.

Both reverse osmosis and evaporatory systems can be adversely affected by precipitating salts that can deposit on the working surface(s), fouling the system and forming scale. The resultant layer of precipitate reduces efficiency and can permanently damage the equipment by clogging or rupturing the membrane or by pitting or forming an insulating layer on the heat transfer surfaces(s).

The likelihood of scale forming depends on the nature of the solution being treated and the operating parameters of the system. A feed solution often contains a variety of very soluble and slightly soluble salts, with the slightly soluble salts being first to reach the saturation point where they precipitate and form scale. Salts in this category include calcium fluoride, calcium sulfate, calcium phosphate, silica, hydrated iron oxides, and other hydrated metal oxides. Other salts in this category are the fluoride, sulfate, and phosphate salts of other alkaline earth metals such as barium and strontium.

To alleviate the problems associated with scaling and fouling in solution concentration systems, a number of remedies have been proposed. These include chemical and physical pretreatment of feed solutions with chelating agents, solubility promoters and filters, and operating on large volumes of solution at very low rates of extraction.

Unfortunately, operating on large volumes of solution at low extraction rates is not always feasible or desirable and is often expensive. Physical and chemical pretreatment of feed solutions is also expensive because of the energy, capital, chemicals, and labor consumed. One alternative, preferential precipitation, promises to be an adequate, cost effective means of controlling scaling and fouling.

In preferential precipitation, scaling and fouling are avoided by allowing solute to preferentially deposit on a slurry of seed crystals suspended in the feed solution. When adequate seed crystal surface area is available, precipitating salts are deposited on the seed and carried away from the working surfaces of the system. This practice is taught in U.S. Pat. No. 4,207,183 issued to Herrigel, which patent is incorporated herein by reference. As taught in Herrigel, the surface area of seed crystal required to prevent scaling is preferably $5.0 \times 10^6$ cm$^2$ per gram of precipitating solute per minute (cm$^2$/g/min). Nucleation crystals generally ranging from about 1 to 100 microns in length, and preferably having an average length of about 10 microns, are used.

Applicant has discovered that under certain circumstances, scaling can sometimes occur despite the presence of what would normally be thought an adequate amount of seed crystal. Specifically, scaling may occur in systems while concentrating solutions at concentration factors at or below about 2, especially in those which operatre between 1 and 2, when only the expected minimum or preferable amount of seed crystal necessary to prevent scaling is initially present.

The term "concentration factor" (C.F.) connotes the degree of change effected by a solution concentration system. It is a comparison between feed solution and effluent, and can be defined mathematically in a number of ways. For example, it can be defined as the concentration of system reject divided by the concentration of system feed:

$$\text{C.F.} = [\text{conc. sys. reject}]/[\text{conc. sys. feed}]$$

This designation is useful when the feed solution is not saturated, or when the concentration factor is measured in terms of one of the highly soluble salts or ions in a solution saturated in less soluble salts. Using concentration to measure C.F. for saturated salts would result in a C.F. of 1, since the concentration of both feed and reject streams would be the same, with precipitate accounting for the solvent removed.

C.F. is often expressed in volumn terms as the volume of feed solution divided by the volume of reject solution:

$$\text{C.F.} = [\text{Volume Feed}]/[\text{Volume Reject}]$$

Expressed in volume terms, C.F. reflects the degree of change effected even in saturated solutions, and as used in this application, concentration factor is usually expressed in volume terms or in terms of concentration of some very soluble salt or ion in solution. There are minor variations between these two methods of expression, but as used herein, the two methods are considered interchangeable. A system concentrating at a concentration factor of 1 is generally not removing solvent and the concentration of system reject is identical to the system feed. A system concentrating at a C.F. of 2 produces a solution roughly twice as concentrated as its feed solution.

The unexpected scaling noted over low concentration factors can be attributed to conditions heretofore unappreciated by those skilled in the art.

Applicant recognized that adding excess seed crystal might eliminate the scaling observed. Since adding a large excess of seed crystal can result in a prematurely thick and unworkable slurry and since the heavier the slurry the more expensive it is to circulate, it is desirable to add only the minimum amount necessary to prevent scaling.

Likewise, applicant considered reducing crystal size, an approach equivalent to increasing the effective amount of available seed crystal. This technique might be used at low concentration factors to solve the aforementioned problems, but it has been found that crystals reduced in diameter to less than about 3 microns form a fouling layer by settling in the laminar flow of the feed stream. Here, they are held against the surface of the transport conduit by a Bernoulli effect, and scale growth can occur.

Other remedies are economically unattractive. For example, in brine concentrators practicing preferential precipitation, one could increase the size of the seed crystal reservoir while maintaining a relatively slow feed solution flow rate. In this manner, less feed solution would be concentrated with each pass across the heat transfer surface, and the available seed crystal surface area per unit volume of feed solution would be effectively increased. Unfortunately, the capital and operating costs associated with increasing the size of the reservoir and circulating less feed solution per pass outweigh the advantages obtained. With the increase in size, the circulators must work against a larger hydrostatic head per unit of extract so that product cost is increased.

Hence, a method of insuring the presence of adquate seed crystal in preferential precipiation system operating over low C.F.'s, while avoiding the early formation of a sludge-like or unworkable slurry, is desirable.

SUMMARY OF THE INVENTION

It is accordingly an object of the present invention to provide a method for maintaining an adequate level of seed crystal in solution concentration systems using preferential precipitation to control scaling and fouling, especially in systems concentrating solutions at concentration factors of about 2 or less, and most especially in systems concentrating solutions over concentration factors between 1 and 2.

Another object is to provide a method of maintaining an adequate level of seed crystals that does not result in early formation of an unworkable slurry and that may be used in conjunction with known seed crystal removal techniques so that an adequate amount of crystal is always present and the consistency of the slurry is maintained at a workable or efficient level.

Additional objects and disadvantages of the invention will be set forth in the description that follows and in part will be obvious from the description, or may be learned by practice of the invention. The objects and advantages of the invention may be realized and obtained by instrumentalities and combinations particularly pointed out in the appended claims.

To achieve these objects and in accordance with the purpose of the invention, the present invention provides a method for maintaining at least the amount of seed crystal required to inhibit scaling and fouling in solution concentration systems employing preferential precipitation to control scaling and fouling. For systems concentrating solutions over concentration factors between 1 and 2 (including 2), the method comprises (a) determining the minimum amount of seed crystal required to prevent scaling for the solution being concentrated at a relatively high concentration factor, "$C.F._{MAX}$," of about 10 or greater, and (b) introducing into the feed solution at least a portion of the amount determined from step (a) according to the following equation:

$$\% \text{ introduced} = 25 \times (C.F.) \times [C.F._{MAX}/(C.F._{MAX} - 1)]$$

For solutions being concentrated at concentration factors greater than 2, scaling can be prevented by (a) determining the minimum amount of seed crystal required to prevent scaling for the solution being concentrated at a high concentration factor, $C.F._{MAX}$, of about 10 or greater, and (b) introducing into the feed solution at least a portion of the amount determined from step (a) according to the equation:

$$\% \text{ introduced} = [1/C.F.)] \times 100 \times [C.F._{MAX}/(C.F._{MAX} - 1)]$$

This latter equation corresponds to the amount prescribed by the Herrigel '183 patent and is not claimed as part of the present invention except as used with the present invention in conjunction with seed crystal removal. In both situations, "% introduced" represents a percentage of the amount of seed crystal required at a relatively high concentration factor, "$C.F._{MAX}$." $C.F._{MAX}$ can be any concentration factor of about 10 or greater, and "C.F." is the concentration factor at which the feed solution will initially be concentrated. Concentration factors "near" 1 are those just above 1.

Accordingly, when a solution is to be concentrated at a concentration factor near 1 and $C.F._{MAX}$ is about 10, $25 \times (1) \times (10/9) = \%$ introduced, and at least about 27.78% of the seed crystal that would be required at a C.F. of about 10 is introduced prior to concentrating. If a $C.F._{MAX}$ of about 100 were used in the calculations above, $25 \times (1) \times (100/99)$ would be the % introduced, and about 25.25% of the seed required at C.F.=100 would be the amount of seed crystal introduced into the solution being concentrated. It so happens that about 25.25% of the seed required at C.F.=100 and about 27.78% of the seed required at C.F.=10 are equal, so that the amount determined in either case is roughly the same. Hence, regardless of the $C.F._{MAX}$ chosen, the amount to be added will be approximately the same and in any event will be within the intended scope of the appended claims.

If the feed solution is to be initially concentrated at a C.F. of 2 and $C.F._{MAX}=100$, about $(25) \times (2) \times (100/99)$, or at least about 50.5% of the seed required at C.F.=100 is added. In fact, introducing at least about 50.5% of the crystal required at a concentration factor of about 100 will protect against scaling over the entire range of concentration factors between 1 and 2. Thus, by introducing at least about 50.5% of the seed required at a concentration factor of about 100 or greater, the scaling sometimes observed between C.F=1 and C.F.=2 can be eliminated, regardless of what specific concentration factor the feed solution will be concentrated to.

If the initial concentration of the feed solution will be greater than 2, $[1-(1/C.F.)] \times 100 \times [C.F._{MAX}/C.F._{MAX} - 1)]$ is used as the equation in step (b). For example, if $C.F._{MAX}$ is chosen as 100 and the feed solution is to be subjected to concentration near C.F.=5, 80.8%, or $[1-(1/5)] \times 100 \times [100/(100-1)]$ % of the seed required at a concentration factor of 100 is introduced into the feed solution to prevent scaling.

In a preferred embodiment, the percent introduced is between $(25) \times (C.F.) \times [C.F._{MAX}/(C.F._{MAX} - 1)]$ and $[1 - (1/C.F.)] \times 100 \times [C.F._{MAX}/C.F._{MAX} - 1)]$.

These equations and the principles underlying their applications can also be understood by reference to the Detailed Description and drawings accompanying this application.

The method of the invention can be used in conjunction with known seed crystal removal techniques so that a workable slurry can be maintained while the presence of an adequate amount of seed crystal is ensured. The method of the present invention is useful in numerous types of solution concentration systems, including "fixed point," "multi-stage," "multiple-effect," and "continuously increasing" systems. These systems are generally known in the art and are briefly described below.

Fixed-point systems are those designed to operate at a relatively constant concentration factor and would ideally require a determinate amount of seed crystal surface area for a given feed solution. Hence, initially adding the requisite minimum amount of seed crystal would normally suffice throughout operation. Multi-stage systems employ a series of concentrating steps, often referred to as stages, to produce a highly concentrated product. For purposes of this invention, each step can be viewed as a separate unit. Multiple-effect systems often contain a series of concentrating units connected in tandem and cooperate to produce a highly concentrated product.

Continuously increasing systems are those that operatre gradually and continuously to increase the effective concentration factor of a given volume of feed solution. For purposes of this invention, the initial concentration factor of these systems is the concentration factor at which the system begins to concentrate. Normally, this value is close to 1.

In accordance with the present invention, the step of introducing seed crystal can be accomplished in all systems by adding seed crystal to the feed stream from outside sources or by recirculating seed crystal already present in the system or by exchanging seed crystal between units. Other alternatives are within the scope of the invention.

The accompanying drawings, which are incorporated in and constitute a part of this specification, together with the description, serve to explain the principles of the invention. The drawings are illustrative of the invention and do not limit the invention to the embodiments or subject matter depicted.

BRIEF DESCRIPTION OF THE DRAWINGS

FIGS. 6a and 6b schematically illustrate multi-stage separation systems practicing the present invention. FIG. 6a represents a continually increasing concentration factor system whereas in FIG. 6b, each stage operates at an essentially fixed concentration factor.

DETAILED DESCRIPTION OF THE PREFERRED EMBODIMENTS

Reference will now be made in detail to the presently preferred embodiments of the invention.

In accordance with the invention, a method for maintaining an adequate level of seed crystal in solvent concentration systems using preferential precipitation while operating at concentration factors of about 2 or less, and especially those operating between 1 and 2, is provided. In conjunction with the present invention, a method of maintaining a workable seed crystal slurry by removing excess seed crystal is also provided.

It was discovered by applicant that the difficulty in maintaining an adequate supply of seed crystal in systems concentrating solutions over low concentration factors can be attributed to a rapid increase in demand for nucleation surface area, and a slow increase in availability, over the range of concentration factors between 1 and 10, and particularly in the range between 1 and 2.

For example, one liter per minute of saturated solution containing 100 grams of solute would theoretically produce 33.34 g per minute of precipitate at C.F.=1.5. The same solution concentrated to C.F.=2.0 would produce 50.0 g per minute of precipitate. Hence, 16.66 grams per minute of additional precipitate would be produced over an increase in C.F. of only 0.5, and roughly $83.3 \times 10^6$ cm$^2$ of seed crystal surface area or $41.65 \times 10^3$ grams of additional seed crystal would be required to accommodate this precipitate. The scaling and fouling observed in preferential precipitation systems over low concentration factors is attributable to this extreme variation in seed crystal demand over even minute, inadvertent changes in concentration factor that are occasioned by fluctuations in feed solution content, power supply, pressure and temperature.

By comparison, at C.F.=10, one liter of the same solution would produce 90 g of precipitate, and only 93.3 g of precipitate at C.F.=15. Hence, only 3.3 additional grams of solute would be produced over an increase in C.F. of 5.0.

When a saturated solution containing seed crystal is concentrated, precipitate is formed, and the relative amount of seed crystal available for precipitation of the remaining solute increases. Precipitated solute can also provide additional surface area for preferential precipitation. Between low concentration factors, however, the demand for seed crystal surface area increases at a rate much greater than the rate at which seed becomes available. For example, if one begins concentrating at a concentration factor of about 1.2 with the minimum amount of seed crystal necessary to prevent scaling at that concentration factor, the amount of seed crystal present will not be adequate to meet demand if the system begins to concentrate at a higher factor, and scale can form. Hence, even in fixed-point systems, minor fluctuations in feed solution and other conditions can cause scaling despite the initial presence of adequate seed crystal.

In systems that begin concentrating at a concentration factor of about 1, introducing at least about 27.8% of the amount of seed crystal necessary to prevent scaling in a given feed solution at a concentration factor of about 10 is sufficient to ensure that the requisite amount of seed crystal necessary to prevent scaling will be present even if concentration factor increases. In these systems, the amount of seed crystal available will equal or exceed the seed required.

Introducing about 55.6% of the seed crystal necessary to prevent scaling for a given feed solution at a concentration factor of about 10 will ensure against scaling and fouling in systems over the entire range of concentration factors between 1 and 2. When about 55.6% is added, (or 50.51% of the seed required at C.F.=100), the amount of seed crystal present will be greater than or equal to the amount required, even if concentration factor is later increased to higher values. These principles are also illustrated in the drawings.

Figure 1:
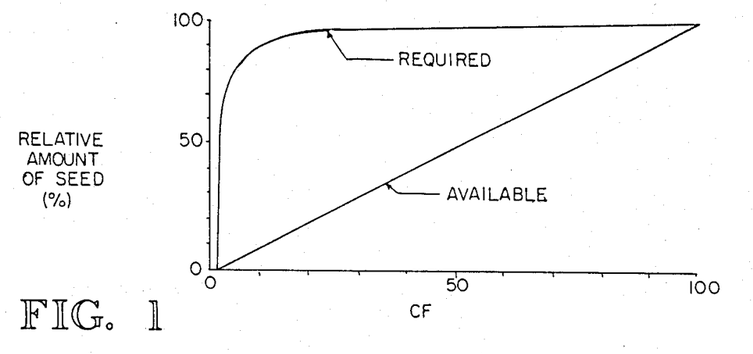
FIG. 1 is a graph representing the relationship between seed required and seed available as concentration factor is increased from a value of 1 to higher values.
Figure 2:
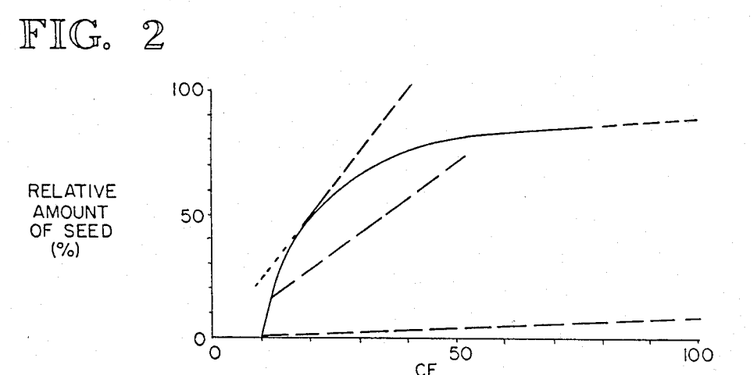
FIG. 2 is a graph representing the relationship between seed required and seed available and also depicting two different systems, both having the requisite minimum amount of seed crystal at a low concentration factor and both systems then increasing to some higher concentration factor. It can be understood from the graph that a deficiency in seed crystal occurs in the system starting at a C.F. of about 1.2 when the concentration factor is increased. In the system beginning at C.F.=2.0 with roughly 50% of the seed required at some high concentration factor of about 100, no deficiency occurs.
Figure 3:
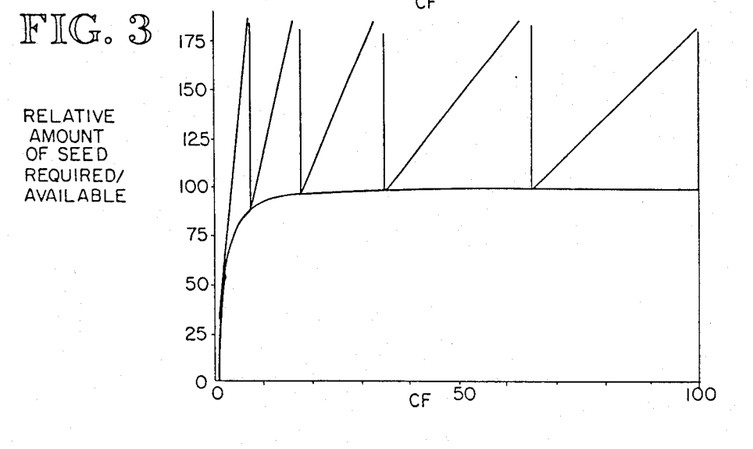
FIG. 3 is a graph representing the seed required curve and a series of curves depicting removal of seed crystal in order to maintain a pumpable slurry. The seed available curve is not shown.

In the drawings, graphs representing the relative need and availability of seed crystal over low concentration factors are shown. In all the drawings, the solutions are saturated in the solute depicted. In FIGS. 1-3, the curves representing relative need and relative availability (sometimes referred to as the "seed required" and "seed available" curves) are expressed as percentages of the seed required and seed available at some very high concentration factor "$C.F._{MAX}$" where nearly all of the precipitating solute would be precipitated from the solution.

The following mathematical expressions represent the relationships plotted:

$$\% \text{ seed required} = [1-(1/C.F.)](100) \times [C.F._{MAX}/(C.F._{MAX}-1)]$$

$$\% \text{ seed available} = [(C.F._n-1)/(C.F._{MAX}-1)] \times 100 \times [C.F._{MAX}/C.F._{MAX}-1)]$$

where $C.F._n$ = any given concentration factor, and $C.F._{MAX}$ = some relatively high concentration factor at which nearly all the solute in the original solution would be precipitated. (In FIG. 1, $C.F._{MAX}$ was chosen to be 100 so that the curves would be spread out and could be more readily distinguished and understood. About 10 or greater is an acceptable $C.F._{MAX}$ for practicing the present invention.) Any C.F. of about 10 or greater can be used, and the results achieved are roughly the same.

As shown by the graph in FIG. 1, the relative "need" curve increases rapidly over the concentration factor range between 1 and 10, and asymptotically approaches a stationary lever after a C.F. of about 10. Hence, while concentration at factors of about 10 or higher, the demand for seed crystal increases only slightly.

Referring to FIG. 2, two curves are shown representing the relative seed required and relative seed available over a range of concentration factors between 1 to 10. $C.F._{MAX}$ for FIG. 2 is 100 and two additional slashed lines representing the relative seed available in two "seeded" feed solutions are also shown. One system begins operating at C.F.=1.2 with the requisite amount of seed crystal necessary for that concentration factor as determined by the Herrigel '183 patent. The other begins operating at C.F.=2.0 with the requisite amount for C.F.=2.0.

As can be seen from the drawing, the system which begins concentration at C.F.=2 always maintains an adequate level of seed crystal even if C.F. is increased, whereas the system which begins concentrating at C.F.=1.2 almost immediately lacks sufficient seed crystal to protect against scaling when concentration factor is increased. Hence, the line representing the seed available in the latter system falls below the seed required curve, and scaling can occur. It can be appreciated from the drawing that if the system depicted as beginning at C.F.=1.2 was a fixed point system, i.e. one designed to operate at C.F.=1.2, minor fluctuations in feed solution, power, or temperature could inadvertently cause an increase in concentration factor and a deficiency in protection.

It can also be appreciated from the drawing that introducing approximately 50.51% of the seed crystal required at $C.F._{MAX}$ into the feed stream would provide protection over the entire range between C.F.=1 and C.F.=2.

In FIG. 2, the dotted line extending between C.F.=1 and C.F.=2, extrapolated from the slashed line depicting the system begining at C.F.=2, illustrates the minimum amount of seed crystal that should be introduced into the feed solution at C.F.'s between 1 to 2 to ensure that adequate seed crystal is always present. As shown, a system that starts to concentrate at concentration factors close to 1 would require about 25.25% of the seed required at C.F.=100. If this amount is introduced into the feed solution prior to concentrating, the amount of available seed will always be greater than or equal to the seed required, even if C.F. increases beyond values close to 1.

In a system that starts to concentrate near C.F.=2, about 50.51% of the amount required at C.F.=100 should be introduced. A system that "starts" to concentrate at C.F.=2 is one where the feed solution will initially be concentrated to about C.F.=2.

If a system begins concentrating somewhere between C.F.=about 1 and C.F.=2, the initial minimum amount of seed crystal required will be somewhere between about 25.25% and 50.51% of what would be required at C.F.=100. The amount required is generally defined by the following equation:

$$\% \text{ introduced} = 25 \times (C.F.) \times [C.F._{MAX}/(C.F._{MAX}-1)]$$

Hence, at concentration factors about 1 (i.e., just above 1), at least about 25.25% of what would be required at $C.F._{MAX}$ is introduced into the feed solution. If the feed solution is about to be concentrated at C.F.=1.5, then at least about 37.88% of what would be required at C.F.=100 is introduced into the feed stream since $C.F._{MAX}$=100. If these percentages of the seed required at $C.F._{MAX}$ are introduced into the feed solution, the system will be protected against scaling even when, after the initial concentration factor is reached, the solution is ultimately concentrated to higher concentration factors.

In systems where the feed solution will initially be concentrated at C.F.'s greater than 2, the amount of seed crystal that should be introduced is prescribed by the Herrigel '183 patent or by the equation:

$$[1-(1/C.F.)] \times 100 \times [C.F._{MAX}/(C.F._{MAX}-1)]$$

Hence, if a system is operating at C.F.=4 and C.F.$_{MAX}$=100, then $[1-(\frac{1}{4})] \times 100 \times [100/(100-1)]$, or 75.76% of the seed required at a C.F. of 100, should be present in the solution prior to concentrating.

The following tables are illustrative of the amounts of seed crystal to be introduced at various concentration factors according to the formulae discussed above:

TABLE 1

| For Solutions Being Concentrated to C.F.'s Between 1 and 2 (Including 2.0) | |
|---|---|
| Initial Operating C.F. | % of Seed Required at C.F.$_{MAX}$ = 100 |
| 1.05 | 26.52 |
| 1.1 | 27.78 |
| 1.25 | 31.57 |
| 1.5 | 37.88 |
| 1.75 | 44.19 |
| 2.0 | 50.51 |

*TABLE 2

| For Solutions Being Concentrated to C.F.'s Greater Than 2 | |
|---|---|
| Initial Operating C.F. | % of Seed Required at C.F.$_{MAX}$ = 100 |
| 2.25 | 56.12 |
| 2.5 | 60.61 |
| 3.0 | 67.34 |
| 4.0 | 75.76 |
| 5.0 | 80.81 |

*These amounts correspond to the amounts prescribed in the Herrigel '183 patent.

In FIG. 3, the "seed required" curve of FIG. 1 is again shown, and a series of curves representing the seed present in the system during seed crystal removal is shown. As can be recognized from the drawing, after seed crystal has accumulated when practicing the present invention, it can be removed from the slurry by conventional means, such as a centrifuge or hydrocyclone, to a level where the slurry contains just enough crystal to prevent scaling and not enough to be difficult or expensive to transport. The formula $[1-(1/C.F.)] \times 100 \times [(C.F._{MAX}/(C.F._{MAX}-1)]$ is used to estimate how much seed crystal should remain in the system if the net concentration factor is 2 or above. As can also be understood from the drawing, removal can be carried out systematically so that when the consistency of the slurry reaches a predetermined point, the seed crystal removal stage is activated. Thus the present invention, in conjunction with known seed crystal removal techniques, provides an efficient way to avoid the early formation of an unworkable slurry while ensuring the presence of adequate seed crystal.

In practicing the present invention, the step of determining the minimum amount of seed crystal necessary to prevent scaling and fouling at a concentration factor, C.F.$_{MAX}$, of about 10 or greater is known in the art and described in the Herrigel patent. For example, by determining the composition of salts in a given feed solution, one skilled in the art could determine which salts will precipitate at a concentration 10 times greater and how much salt will be precipitated. By using this data and the volume rate of flow for the system, one skilled in the art could calculate the grams of solute per minute that would theoretically be precipitated, multiplying this amount by $5.0 \times 10^6$ cm$^2$/gram/minute as described in Herrigel. ($2.0 \times 10^6$ cm$^2$/g/min is also useful as a constant and is considered to be within the scope of the appended claims. As used herein, the requisite "minimum" amount and the requisite "preferable" amount are identical terms that connote using an amount within the scope of the Herrigel patent referred to earlier.) Using these constants, determining the requisite amount of seed crystal for the solution being concentrated at C.F.=10 is readily performed.

Because temperature, pressure and background salts can influence solubility, and because the kinetics of deposition are not always predictable, it is recommended that empirical tests be performed to assure that the theoretical calculations described above accurately reflect the characteristics of the feed solution. This is especially true where background salt concentrations are fairly high and the feed solution becomes concentrated to the point where the ionic properties of the solutes begin to affect overall solubility. Hence, in practicing the present invention, one should empirically test the solubility calculations, and slight variations in the amount of seed crystal introduced may be necessary to compensate for deviations noted in empirical tests. One example of such deviations is supersaturation where less solids precipitate than expected and, therefore, less seed crystal than expected is required. (Except in systems where the supersaturated liquids may eventually be concentrated further and precipitation to a saturated state occur in subsequent stages. In these stages, more seed crystal may be required than expected for a saturated solution.) It is to be understood, however, that such adjustments are within the spirit of the present invention and the appended claims.

It is also to be understood that the principles set forth herein encompass systems that use preferential precipitation to capture or reclaim solutes as well as those with an eye toward extracting relatively pure solvents.

Figure 4A:
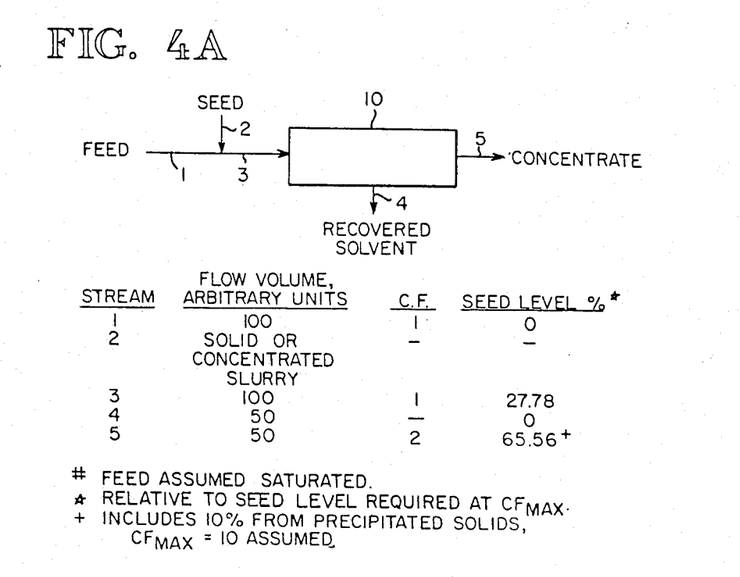
FIGS. 4a, b and c schematically illustrate single-stage concentration systems practicing the present invention. It will be understood by those skilled in the art that reverse osmosis or other types of concentration systems, such as electrodialysis systems or evaporators could be used as the means for concentrating depicted throughout the drawings.
Figure 4B:
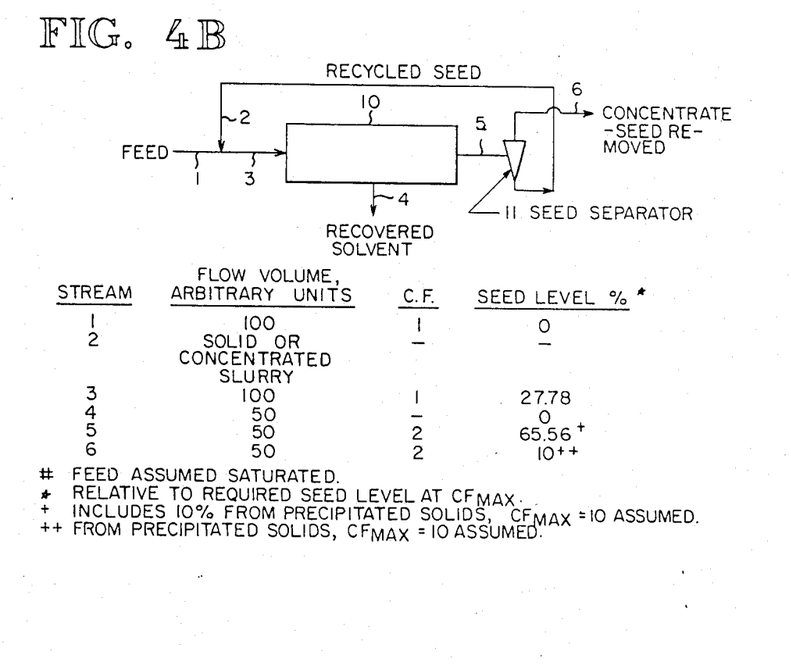
Figure 4C:
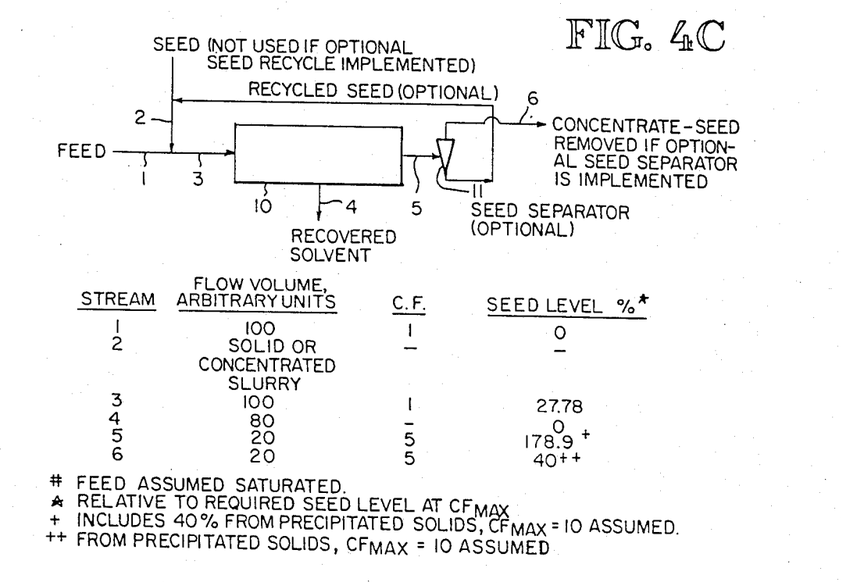
Figure 5:
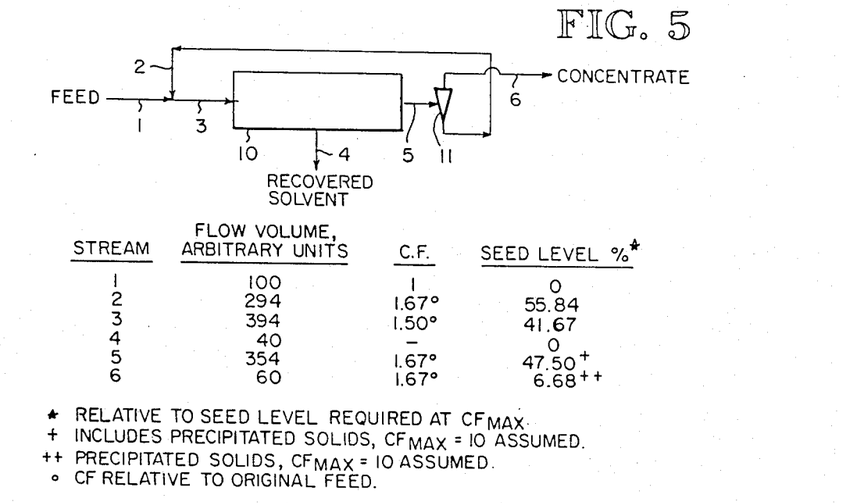
FIG. 5 schematically illustrates a single-stage, essentially fixed-point concentration system practicing the present invention.
Figure 6A:
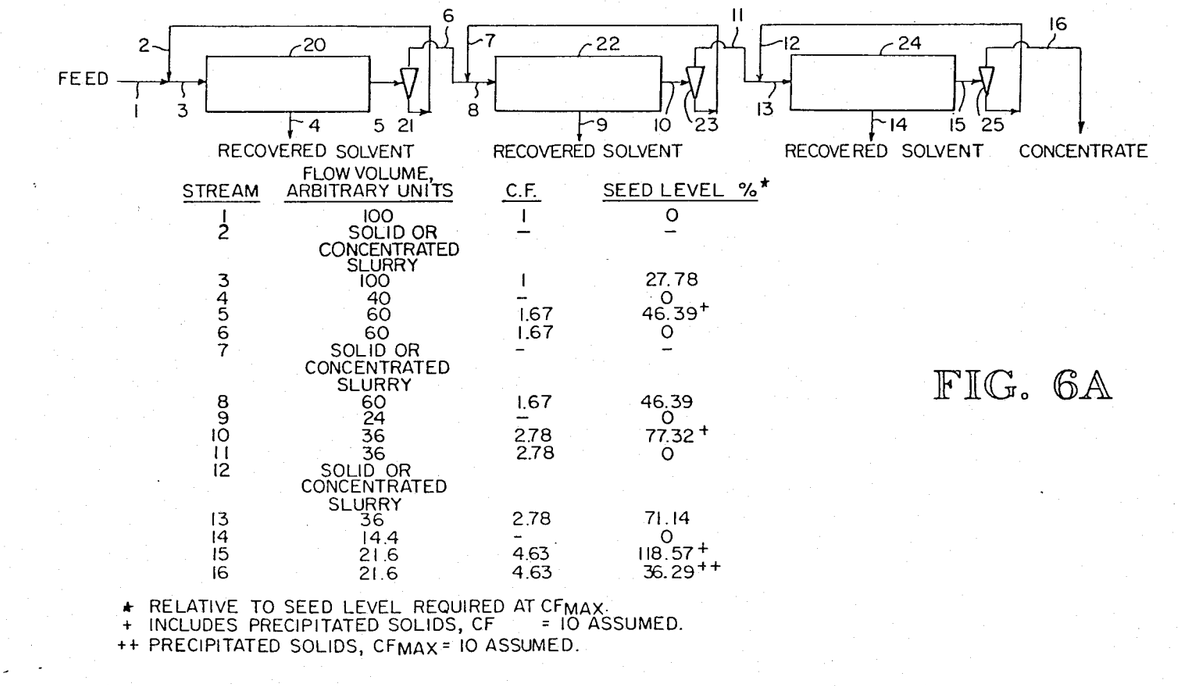
Figure 6B:
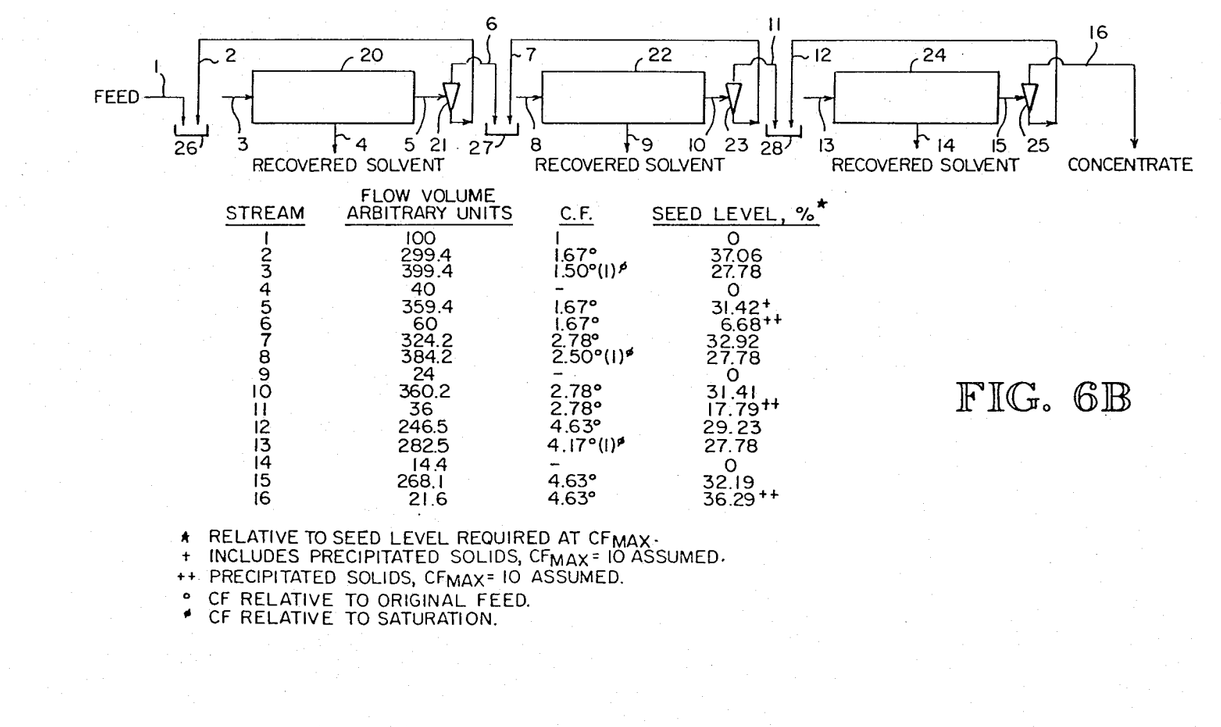

Referring now to FIGS. 4 through 6, several examples of concentration systems capable of using the present invention are shown schematically. Those skilled in the art will readily understand that any of the well-known types of concentration equipment, including reverse osmosis systems, electrodialysis systems, or evaporators, might be represented by the figures since the concentration units are depicted generally. It will also be understood that the examples shown are illustrative only, that other arrangements may be readily conceived by those skilled in the art, and that such variations fall within the scope of this invention insofar as the principles described herein are used. The quantitative values associated with the various FIGS. 4 through 6 are to be understood to be examples only of the application of the principles taught, and are not intended to restrict the scope of this invention.

FIGS. 4–6 show examples of systems practicing the present invention. A C.F.$_{MAX}$ of 10 is assumed for all the examples and is used in connection with the equations cited. For purposes of simplifying FIGS. 4–6 and more plainly illustrating the principles of the invention, no increase in flow volume is shown when solids are added to the liquid feed stream.

FIGS. 4$a$, 4$b$, and 4$c$ show single-stage concentration systems wherein the concentration factor starts very near 1 and increases to higher values. Scale is controlled by preferential precipitation.

FIG. 4a shows concentration means 10, which includes any one of several concentration methods discussed earlier. Prior to concentrating, feed stream 1 is combined with a seed stream 2, represented as a solid or highly concentrated slurry, to form combined stream 3, which enters the concentration means 10. As also noted earlier, for purposes of more plainly illustrating the invention, no increase in flow volume is depicted when the solid crystal is added. As the concentration means 10 is traversed by the feed stream, the concentration factor gradually increases until a net C.F. of 2 is reached. Purified solvent stream 4 is produced. Concentrated stream 5 contains some dissolved solids, some precipitated solids, and the seed initially added by stream 2.

Since the unit begins concentrating at a concentration factor near 1, the amount of seed that must be present in the stream to be concentrated is chosen in accordance with the equation:

$$\% \text{ introduced} = 25 \times (C.F.) \times [C.F._{MAX}/(C.F._{MAX}-1)]$$

In this arrangement, no seed is recovered from exit stream 5. The seed and solution pass from the system via stream 5. New seed from outside the system must be continually added as seed stream 2 if scaling is to be prevented.

The precent of seed introduced is expressed as a percentage of the seed that would be required to prevent scaling at a high concentration factor, "$C.F._{MAX}$," in this case 10. As can be seen from the drawing, at least $25 \times (1.0) \times (10/9)$, or at least 27.78% of the seed required at C.F.=10, is introduced into the feed stream 1 via stream 2. If at least this amount is added, a net concentration factor 2 or greater can be reached without scaling.

FIG. 4b shows a system similar to the system of FIG. 4a, but slightly more complicated. In the system of FIG. 4b, a seed recovery means 11 is used to recapture seed. Those skilled in the art will recognize that one may choose for this purpose any of several well-known devices including filters, centrifuges, settler thickeners, hydroclones, and others. The recovery means 11 operates on the concentrated stream 5 to remove seed crystal. Seed recycle stream 2 returns the seed crystal to upstream of the concentration means 10, for use in seeding feed stream 1. The recycle stream 2 is shown as devoid or nearly devoid of liquid. Filters are centrifuges are preferred for producing nearly liquid-free recycle streams. However, seed recovery devices such as settler thickeners and hydroclones can be used equally well, the difference being that some liquid will be recycled and the volume of stream 2 will be increased. One consequence of increasing the volume of stream 2 is that the volume of stream 3 will also be increased, and this additional volume shown be considered in estimating how much precipitate will be formed. There is also the possibility that the recirculated liquid will be supersaturated and that it will be hard to predict exactly how much precipitate will be formed when the solution is further concentrated. Hence, empirical testing may be useful in estimating how much precipitate will be formed. A method for dealing with the problems associated with supersaturation is discussed below in connection with FIG. 5.

As can be seen in FIG. 4b, at least about 27.78% of the seed that would be required if the feed stream were to be concentrated at a concentration factor of 10 is present in stream 3 prior to concentrating. Hence, the system is protected.

FIG 4c shows a single-stage concentration system similar to those in FIGS. 4a and 4b. In FIG. 4c, the seed recovery means 11 is shown as an optional installation. Thus, when the option is exercised, the system operates similarly to the system of FIG. 4b, and when the option is not exercised, the system operates similarly to the system of FIG. 4a. FIG. 4c is shown an initially concentrating at a C.F. of about 1 and gradually increasing to a C.F. of 5 to exit stream 5. Thus, the system of FIG. 4c falls within the scope of the present invention, since concentration occurs over concentration factors between 1 and 2 inclusive. Of course, operation to concentration factors higher than 5 could easily be accomplished by using the seed.

Turning now to FIG. 5, an essentially "fixed-point" or "fixed concentration factor" concentration system is depicted showing seed recycle.

The system operates at a fixed concentration factor of about 1.1, (compare stream 3 with stream 5). Hence, at least $(25) \times (1.1) \times (10/9)$, or 30.56% of the seed required at C.F. =10 would normally be added to prevent scaling. This amount is derived from the formula:

$$\% \text{ introduced} = (25) \times (C.F) \times (10/9).$$

In the diagram, a seed recycle stream 2 containing a slurry comprised of saturated liquid and seed crystal is recirculated. It can be understood that when additional saturated liquids are introduced via seed recycle stream 2, the effective volume of the feed stream is increased. Since the additional saturated solution is capable of precipitating solutes, it must be taken into consideration when performing calculations in accordance with the present invention.

Hence, if the flow volume of feed stream 1 is 100, the solid volume of seed crystal is considered negligible, and the volume of saturated liquid in seed recycle stream 2 is 294, the effective flow volume of the solution being concentrated is 394 for purposes of calculating how much seed crystal would be necessary if the feed solution were to be concentrated at a concentration factor of 10 or greater. It is necessary to take into account not only the solutes that will precipitate from the saturated liquid in stream 2, but also the possibility that stream 2, having been through the concentration means 10, might be supersaturated.

Thus, to compensate for this possibility, additional seed crystal is added to ensure that scaling will not occur. Preferably, the amount added is based on empirical analysis of supersaturated conditions during normal operation. Alternatively, one can assume that none of the dissolved solids precipitated on the first pass of feed solution through the concentration means and that all of these solids will subsequently precipitate and require seed crystal. This latter situation is shown in FIG. 5 wherein stream 3 contains 41.67% of the seed required at $C.F._{MAX}$ and has an effective C.F. of 1.5.

Thus, in FIG. 5, the system operating at a concentration factor of 1.1 could be protected from scaling by practicing the present invention in the following manner:

A. Calculate how much seed crystal would be necessary to prevent scaling if the effective volume of feed solution were to be concentrated at a concentration factor of 10. This is accomplished by estimating the amount of solute that would be precipitated if the combined feed stream and liquid from the seed recycle stream were to be concentrated at a concentration factor of 10.

B. Determine how much seed crystal would be necessary to accommodate the above-determined amount of solute in accordance with the Herrigel '183 patent.

C. Ensure that at least a percentage of this amount is present in the combined stream 3 in accordance with the following equation:

$$\% \text{ introduced} = 25 \times (C.F.) \times (10/9),$$

where C.F. is the average effective concentration factor of the stream being concentrated. In the diagram the concentration factor of stream 1 is 1.0 and the effective concentration factor of stream 2 is 1.67. Based on flow volumes, the average concentration factor is 1.50. Hence, when 1.5 is used as "C.F." in the equation of the present invention, even supersaturated solutions will be protected against scaling and fouling. Thus, at least about $(25) \times (1.5) \times (10/9)$ or 41.67% of the seed that would be required at a concentration factor of 10 should be introduced into the effective feed solution to insure against scaling. This amount of seed has in fact been introduced via seed recycle stream 2.

Turning now to FIGS. 6a and 6b, multi-stage concentration systems are shown. These systems consist of several individual stages connected together. FIG. 6a shows individual stages connected together, with each stage designed to begin concentrating at a concentration factor near 1 and increase as the feed solution traverses the concentration means 10. FIG. 6b shows a multi-stage system with each stage having a fixed-point concentration means. Between each stage, the concentrates from the previous stage are mixed in a feed tank with a seed recycle stream to relieve any supersaturation present in the recycle stream.

In FIG. 6a, a feed stream 1 is combined with a seed recycle stream 2 to form a combined stream 3 which enters the concentration means 20. Purified solvent stream 4 is extracted, and concentrated stream 5 engages from the concentration means 20 at a net concentration factor of about 1.67.

Seed recovery unit 21 removes seed crystal from concentrated stream 5 in an amount sufficient to provide seed crystal recycle stream 2. Exit stream 6 leaving the system is comprised of solvent, dissolved solids and suspended solids. The "total solids" in exit stream 6 is equal to the "total solids" introduced by feed stream 1. Thus, the solids content of the system is at equilibrium, as wise is the amount of seed crystal recycled. Likewise, the flow volume of the system is at equilibrium since the flow volume of the purified solvent stream is 40 units, the flow volume of exit stream 6 is 60 units, and the total flow volume into the system is 100 units. Because concentration unit 20 begins concentrating at a concentration factor near 1 and increases to a higher concentration factor, the amount of seed crystal necessary to prevent scaling in combined stream 3 is calculated in accordance with the equation:

$$\% \text{ introduced} = 25 \times (C.F.) \times [C.F._{MAX}/(C.F._{MAX} - 1)].$$

Exit stream 6 enters the next stage of the concentration system where it is combined with solid seed crystal stream 7 shown as having a negligible volume. Since concentration unit 22 beings concentrating at a factor near 1, the amount of seed crystal added would normally be calculated in accordance with the equation:

$$\% \text{ introduced} = 25 \times (1) \times (10/9).$$

As can be seen from the drawing, seed stream 7 and the solids already suspended in exit stream 6 provide an additional amount of seed crystal to compensate for the possibility of supersaturation in stream 6. Because exit stream 6 is potentially supersaturated at a concentration factor near 1.67, it can be assumed that the second stage in the concentration system begins concentrating not at a factor of 1, but at an effective concentration factor of 1.67. Thus, $(25) \times 1.67 \times (10/9)$, or 46.39% of the seed crystal required at a concentration factor of 10 should be present in the system to protect against the additional precipitation that may result when the supersaturated condition is relieved. At least this amount is added via seed recycle stream 7. Combined stream 8 enters the concentration unit 22, which begins concentrating at a concentration factor near 1 and increases to higher concentration factors. Recovered solvent stream 9 is extracted, and concentrated stream 10 emerges from the concentration unit 22 at a concentration factor of 1.67 relative to stream 8 and a net concentration factor of 2.78 relative to stream 1. Seed recovery unit 23 treats concentrated stream 10 to remove and recycle solids. The remaining stream passes to the third stage of the multi-stage system as exit stream 11, which is depicted as a supersaturated stream. Stream 11 contains all the solids that ideally would have precipitated as dissolved solids and has a total solids content equal to the solids content in original feed stream 1.

Exit stream 11 is combined with seed recycle stream 12 to form combined stream 13. Again, the volume of the seed crystal is assumed to be negligible, and it is assumed that supersaturation exits with respect to the liquid transporting the seed. Hence, the seed crystal present is sufficient to prevent scaling based not on starting C.F. of near 1, but a net C.F. of about 2.78. (By this time, some solids normally would have precipitated and intermediate seed crystal values could be used. The diagram is illustrative, however, of how the present invention could be used if supersaturated conditions presisted.)

Combined stream 13 then enters concentration unit 24 where it is concentrated, producing recovered solvent stream 14. Resultant concentrated stream 15 emerges from the concentration unit 24 with a net concentration factor of 4.63 relative to feed stream 1. Send recovery unit 25 removes all solids from concentrated stream 15 to recycle the seed of seed recovery stream 12. After leaving seed recovery unit 25, the supersaturated condition of the solutions is depicted as being relieved in exit stream 16. Hence, all the expected precipitate from the system is formed, and exit stream 16 is shown as containing solids in the amount that would ideally have been precipitated throughout the system. The solids in the system are maintained at equilibrium, since the total solids exiting the system in exit stream 16 represents all the solids that were present as dissolved solids in feed stream 1. Likewise, the total volume flow of the system is at equilibrium, since the volume flow of the recovered solvent streams coupled with the volume flow of exit stream 16 is 100 units, the volume flow of incoming feed stream 1.

In FIG. 6a the degree of supersaturation is assumed to be 100%. Normally, some intermediate value occurs and empirical tests can be used to predict the degree of supersaturation. Accordingly, the amount of precipitates actually being formed can be estimated, and based on this amount, an appropriate level of seed crystal can be employed in accordance with the present invention.

Referring now to FIG. 6b, there is shown a multi-stage concentration system comprised of single stages which operate within a narrow range of concentration factors between 1 and 1.2. At the beginning of each stage, there is a feed tank designed to mix the incoming feed solution with a seed recycle stream. The purpose of the feed tank is two-fold. First, it provides a physical structure in which the two streams can be thoroughly mixed to form a combined feed stream. Second, it ensures that the combined feed stream entering each concentration unit will be saturated and that any supersaturated condition from previous stages will be relieved. While it is possible to operate the system without the feed tanks, as with FIG. 6a, the presence of the tanks leads predictability to the system since the combined feed streams entering each concentration unit are known to be saturated.

In the system depicted, feed stream 1 with a flow volume of 100 units enters feed tank 26 and is combined with seed recycle stream 2 having a flow volume of 299.4. The concentration means begins concentrating near 1 and increases to a concentration factor slightly greater than 1. The relative flow volumes and percent of seed present are calculated so that, per the above mentioned formulae, combined stream 3, having a flow volume of 399.4 units, contains roughly 27.78% of the seed that would be required if the saturated liquid in combined stream 3 were to be concentrated at a concentration factor of 10. Concentration unit 20 concentrates stream 3 by removing solvent thus producing recovered solvent stream 4. Concentrated stream 5, having a flow volume of 359.4, is roughly 1.1 times more concentrated than combined stream 3. Hence, the system is operating at a net concentration factor of 1.1, although it begins concentrating at about 1. In accordance with the equation, % introduced = (25) (1) (10/9), 27.78% of the seed required at a concentration factor of 10 is incorporated into the combined feed stream prior to concentration.

In the first stage, exit stream 6 is roughly 1.67 times as concentrated as feed stream 1 and contains the amount of solids that were precipitated by feed stream 1 when concentrated. The effective concentration factor of exit stream 6 is higher than the 1.11 operating C.F. of the system because an amount of solids equal to the solids that precipitated from feed stream 1 are contained in exit stream 6 which has a flow volume of only 60 units.

Exit stream 6 then enters feed tank 27 and is combined with seed recycle stream 7. The amount of seed crystal provided is sufficient to prevent scaling when combined stream 8 is concentrated starting at a concentration factor near 1. This amount corresponds to 27.78% of the amount of seed crystal that would be required to prevent scaling if combined stream 8 were to be concentrated at a concentration factor of 10. Purified solvent stream 9 is extracted by concentration unit 22.

The remaining stream, concentrated stream 10, is routed to seed recovery unit 23 which removes solids in an amount sufficient to supply the seed crystal needs of seed recycle stream 7. The remaining solids pass with exit stream 11 to feed tank 28. Stream 11 is mixed with seed recycle stream 12 to ensure that any supersaturated conditions are relieved prior to concentrating. Streams 11 and 12, as combined stream 13, enter concentration unit 24 and purified solvent stream 14 is extracted. Concentration unit 24 begins operating at a concentration factor near 1. Hence, roughly 27.78% of the seed crystal that would be required if stream 13 were to be concentrated at a concentration factor of 10 is added via seed recycle stream 12. Concentrated stream 15, now at a net concentration factor of 4.63 relative to orginal feed stream 1, leaves the concentration unit 24 and is treated by seed recovery unit 25 which removes solids in an amount sufficient to supply the needs of seed recycle stream 12. The remainder exits as exit stream 16.

As can be appreciated from FIG. 6b, the solid flow of the system is at equilibrium because the amount of solids exiting the system as dissolved and suspended solids is equal to the amount of dissolved solids introduced by feed stream 1. Likewise, the volume flow of the system is at equilibrium since feed stream 1 introduces 100 units of volume and the respective volumes of recovered solvent streams 4, 9 and 14 when added to the volume of exit stream 16 equals 100.

When initially operating the system, before the system has reached solid and volume flow equilibrium, seed crystals can be added to the feed tanks 26, 27, and 28 from outside sources so that adequate seed crystal is present to prevent scaling. This seed crystal can then be recaptured by seed recovery units 21, 23 and 25 and used during subsequent operations.

The following example also serves to illustrate the invention.

EXAMPLE (THEORETICAL)

A feed solution containing two salts is analyzed by known methods that show:

Salt Concentration in Solution 0.02 grams/liter of X [Saturation = 5 g/liter]
0.02 grams/liter of Y [Saturation point = 0.05 g/l]

In order to determine the requisite minimum amount of seed crystal at a concentration factor of about 10, one first determines the amount of precipitate that will form when the solution is 10 times more concentrated.

Salt Concentration in Solution Concentrated 10 times 0.2 grams/liter of X (still in solution)
0.05 grams/liter of Y (0.05 in solution; 0.15 grams precipitate)

If the system would behave ideally and concentrate about 1 liter/minute at C.F. = 10, then 0.15 grams of Y will be precipitated each minute. Since about $5.0 \times 10^6$ cm$^2$/gram/min of seed crystal surface area would be required to prevent scaling, (0.15 g/min.) × ($5.0 \times 10^6$ cm$^2$/gm/min), or $7.5 \times 10^5$ cm$^2$ of crystal surface area would be required at a concentration factor of about 10. It is determined by known methods that this corresponds to approximately 375 grams of seed when seed crystals averaging 10 microns are used.

In systems that begin concentrating at a C.F. near 1, (25 × (1) × (10/9)), or 27.78 percent of this amount of seed crystal would be introduced per liter of feed solution. (Roughly 104 grams/liter.)

In systems initially concentrating at a C.F. of 2, roughly (25)×(2)×(10/9) or 55.56% is necessary. This corresponds to about 208 grams per liter of flow.

As used in this application, "solution concentration systems," "purifiers," and the like include systems used to concentrate, capture, or reclaim solutes as well as those operated to obtain solvents. The terms "requisite minimum amount of seed crystal," "preferred minimum amount," "adequate amount," and the like generally refer to the amount of seed crystal required as disclosed in the Herrigel patent discussed above. Preferably about $5.0 \times 10^6$ cm$^2$/gram/min is employed, though at least about $2.5 \times 10^6$ cm$^2$/gram/min is within the scope of this invention.

Additionally, it is understood to be within the scope of the present invention that the method disclosed herein can be used in conjunction with seed crystal removal techniques to provide an efficient and economical means for maintaining a workable seed crystal slurry while assuring the presence of an adequate amount of crystal.

It will be apparent to those skilled in the art that various modifications and variations could be made in the process of the invention without departing from the scope or spirit of the invention.

What is claimed is:

1. In a method comprising, maintaining an adequate amount of seed crystal required to inhibit scaling and fouling in solution concentration systems employing preferential precipitation and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
   (a) determining the minimum amount of seed crystal necessary to prevent scaling for the particular solution being concentrated at a relatively high concentration factor, C.F.$_{MAX}$, of about 10 or greater;
   (b) providing a percentage multiplier determined as follows:

$$\% \text{ multiplier} = 25 \times (\text{C.F.}) \times [\text{C.F.}_{MAX}/(\text{C.F.}_{MAX}-1)]$$

wherein C.F. is the concentration factor at which the feed solution will initially be concentrated, and wherein C.F.$_{MAX}$ is some relatively high concentration factor of about 10 or greater, which said percentage multiplier is multiplied by the amount determined in step (a) above to determine an amount to be introduced to the feed solution; and
   (c) introducing to the feed solution the amount determined in step (b) above.

2. In a method comprising, maintaining an adequate amount of seed crystal required to inhibit scaling in solution concentration systems employing preferential precipitation and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
   (a) determining the minimum amount of seed crystal necessary to prevent scaling at a concentration factor of about 10 or greater;
   (b) providing a percentage multiplier equal to about 55.6% which is multiplied by the amount determined in step (a) above to determine an amount to be introduced to the feed solution; and
   (c) introducing into the feed solution the amount determined in step (b) above.

3. The method of claim 2 wherein step (c) further comprises the steps of circulating a slurry of seed crystals in said system to provide preferential surface area for precipitates, and removing a sufficient amount of seed crystal from said slurry to maintain a workable slurry, leaving in said slurry at least the minimum amount of seed crystal required to prevent scaling and fouling.

4. In a method comprising, maintaining an adequate amount of seed crystal required to inhibit scaling and fouling in solution concentration systems employing preferential precipitation and concentrating solutions beginning at an initial concentration factor of about 1, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
   (a) determining the minimum amount of seed crystal required to prevent scaling for the solution being concentrated at a concentration factor of about 10 or greater;
   (b) providing a percentage multiplier of at least 27.8% which is multiplied by the amount determined in step (a) above to determine an amount to be introduced to the feed solution; and
   (c) introducing into the feed solution the amount determined in step (b) above.

5. The method of claim 4 wherein step (c) further comprises the steps of circulating a slurry of seed crystals in said system to provide preferential surface area for precipitates, and removing a sufficient amount of seed crystals from said slurry to maintain a workable slurry consistency, leaving in said slurry at least the minimum amount of seed crystal necessary to maintain adequate seed crystal surface area.

6. The method of claim 4 wherein said percentage multiplier is between about 27.8% and about 55.6%.

7. The method of claim 4 wherein said percentage multiplier is about 55.6%.

8. In method for maintaining an adequate amount of seed crystal in a a reverse-osmosis filtration system having at least one semipermeable membrane for selectively allowing the passage of solvents while obstructing the passage of solutes and employing a slurry of seed crystals in solution concentration systems employing preferential precipitation, and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
  (a) determining the minimum amount of seed crystal necessary to prevent scaling for the particular solution being concentrated at a concentration factor of about 10 or greater;
  (b) providing a percentage multiplier equal to about 55.6% which is multiplied by the amount determined in step (a) above to determine an amount to be introduced to the feed solution of the reverse-osmosis filtration system; and
  (c) introducing into the feed solution the amount determined in step (b) above.

9. In a method for maintaining an adequate amount of seed crystal required to inhibit scaling and fouling in a reverse-osmosis filtration system having at least one semipermeable membrane for selectively allowing the passage of solvents while obstructing the passage of solutes and employing a slurry of seed crystals in solution concentration systems employing preferential precipitation, and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
  (a) determining the minimum amount of seed crystal necessary to prevent scaling for the particular solution being concentrated at a relatively high concentration factor, $C.F._{MAX}$, of about 10 or greater;
  (b) providing a percentage multiplier determined as follows:

$$\% \text{ multiplier} = 25 \times (C.F.) \times [C.F._{MAX}/(C.F._{MAX} - 1]$$

wherein C.F. is the concentration factor at which the feed solution will initially be concentrated, and wherein $C.F._{MAX}$ is some relatively high concentration factor of about 10 or greater, which said percentage multiplier is multiplied by the amount determined in step (a) above to determine an amount to be introduced to the feed solution; and
  (c) introducing to the feed solution the amount determined in step (b) above.

10. In a method comprising, maintaining an adequate amount of seed crystal required to inhibit scaling and fouling in a reverse-osmosis filtration system having at least one semipermeable membrane for selectively allowing the passage of solvents while obstructing the passage of solutes and employing a slurry of seed crystals in solution concentration systems employing preferential precipitation, and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
  (a) determining the minimum amount of seed crystal required to prevent scaling for the solution being concentrated at a concentration factor of about 10 or greater;
  (b) providing a percentage multiplier of at least 27.8% which is multiplied by the amount determined in step (a) above to determine an amount to be introduced to the feed solution; and
  (c) introducing into the feed solution the amount determined in step (b) above.

11. The method of claim 10 wherein said percentage multiplier is between about 27.8% and about 55.6%.

12. The method of claim 10 wherein said percentage multiplier is about 55.6%.

13. In a method comprising, maintaining an adequate amount of seed crystal crystal in brine concentrators, electrodialysis concentrators, desalinators or evaporators practicing preferential precipitation and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
  (a) determining the minimum amount of seed crystal necessary to prevent scaling for the solution being concentrated at a concentration factor of about 10 or greater;
  (b) providing a percentage multiplier equal to about 55.6% which is multiplied by the amount determined in step (a) above to determine an amount to be introduced to the feed solution of the relevant system; and
  (c) introducing into the feed solution the amount determined in step (b) above.

14. In a method comprising, maintaining an adequate amount of seed crystal in a brine concentrators, electrodialysis concentrators, desalinators or evaporators practicing preferential precipitation and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:
  (a) determining the minimum amount of seed crystal necessary to prevent scaling for the particular solution being concentrated at a relatively high concentration factor, $C.F._{MAX}$, of about 10 or greater;
  (b) providing a percentage multiplier determined as follows:

$$\% \text{ multiplier} = 25 \times (C.F.) \times [C.F._{MAX}/(C.F._{MAX} - 1)]$$

wherein C.F. is the concentration factor at which the feed solution will initially be concentrated, and wherein $C.F._{MAX}$ is some relatively high concentration factor of about 10 or greater, which said percentage multiplier is multiplied by the amount determined in step (a) above to determine an amount to be introduced to the feed solution; and (c) introducing to the feed solution the amount determined in step (b) above.

15. In a method comprising, maintaining an adequate amount of seed crystal in brine concentrators, electrodialysis concentrators, desalinators or evaporators practicing preferential precipitation and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:

(a) determining the minimum amount of seed crystal required to prevent scaling for the solution being concentrated at a concentration factor of about 10 or greater;

(b) providing a percentage multiplier of at least 27.8% which is multiplied by the amount determined in step (a) above to determine an amount to be introduced to the feed solution; and (c) introducing into the feed solution the amount determined in step (b) above.

16. The method of claim 15 wherein said percentage multiplier is between about 27.8% and about 55.6%.

17. The method of claim 15 wherein said percentage multiplier is about 55.6%.

18. In a method comprising maintaining an adequate amount of seed crystal required to inhibit scaling and fouling in multi-stage solution concentration systems having a series of stages or units for concentrating solutions and practicing preferential precipitation, and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:

(a) determining the minimum amount of seed crystal necessary to prevent scaling for the feed solution being concentrated at a concentration factor of about 10 or greater;

(b) providing a percentage multiplier equal to about 55.6% which is mutiplied by the amount determined in step (a) above to determine an amount to be introduced to the feed solution of the multi-stage solution concentration system; and (c) introducing into said feed solution the amount determined in step (b) above.

19. In a method comprising, maintaining an adequate amount of seed crystal required to inhibit scaling and fouling in multi-stage solution concentration systems having a series of stages or units for concentrating solutions and practicing preferential precipitation, and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:

(a) determining the minimum amount of seed crystal necessary to prevent scaling for the particular solution being concentrated at a relatively high concentration factor, $C.F._{MAX}$, of about 10 or greater;

(b) providing a percentage multiplier determined as follows:

$$\% \text{ multiplier} = 25 \times (C.F.) \times [C.F._{MAX}/(C.F._{MAX} - 1)]$$

wherein C.F. is the concentration factor at which the feed solution will initially be concentrated, and wherein $C.F._{MAX}$ is some relatively high concentration factor of about 10 or greater, which said percentage multiplier is multiplied by the amount determined in step (a) above to determine an amount to be introduced to the feed solution; and (c) introducing to the feed solution the amount determined in step (b) above.

20. In a method comprising maintaining an adequate amount of seed crystal required to inhibit scaling and fouling in multi-stage solution concentration systems having a series of stages or units for concentrating solutions and practicing preferential precipitation, and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:

(a) determining the minimum amount of seed crystal required to prevent scaling for the solution being concentrated at a concentration factor of about 10 or greater;

(b) providing a percentage multiplier of at least 27.8% which is multiplied by the amount determined in step (a) above to determine an amount to be introduced to the feed solution; and (c) introducing into the feed solution the amount determined in step (b) above.

21. The method of claim 20 wherein said percentage multiplier is between about 27.8% and about 55.6%.

22. The method of claim 20 wherein said percentage multiplier is about 55.6%.

23. In a method comprising, maintaining an adequate amount of seed crystal required to inhibit scaling and fouling in solution concentration systems employing preferential precipitation and concentrating solutions at an initial concentration factor between 1 and 2, which said concentration factor increases during successive concentration steps, said method comprising substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:

(a) determining the minimum amount of seed crystal necessary to prevent scaling for the particular solution being concentrated at a relatively high concentration factor, $C.F._{MAX}$, of about 10 or greater;

(b) providing a percentage multiplier determined as follows:

$$\% \text{ multiplier} = [1-(1/C.F.)] \times 100 \times [C.F._{MAX}/(C.F._{MAX}-1)]$$

wherein C.F. is the concentration factor to which the feed solution will have been concentrated at any point in the system, and wherein $C.F._{MAX}$ is some relatively high concentration factor of about 10 or greater, which said percentage multiplier is multiplied by the amount determined in step (a) above to determine the amount of seed crystals to be maintained in the concentrating solution at the concentration factor then reached; and (c) maintaining in the concentrating solution the amount of seed crystals determined in step (b) above.

24. In a method comprising, maintaining an adequate amount of seed crystal required to inhibit scaling and fouling in solution concentration systems employing preferential precipitation and concentrating solutions at an initial concentration factor between 1 and 2, which said concentration factor increases during successive concentration steps, said method comprising, substantially precluding seed crystal deficiency in the system, and thereby scaling, when the concentration factor is less than about 2, and substantially precluding overloading of the system with seed crystals, and thereby minimizing pumping problems, when the concentration factor is at least about 2, by:

(a) determining the minimum amount of seed crystal necessary to prevent scaling for the particular solution being concentrated at a relatively high concentration factor, $C.F._{MAX}$, of about 10 or greater;

(b) providing a multiplier determined as follows:

$$\% \text{ multiplier} = [1-(1/C.F.)] \times 100 \times [C.F._{MAX}/(C.F._{MAX}-1)]$$

wherein C.F. is the concentration factor to which the feed solution will have been concentrated when overloaded with seed crystals, and wherein $C.F._{MAX}$ is some relatively high concentration factor of about 10 or greater, which said percentage multiplier is multiplied by the amount determined in step (a) above to determine the amount of seed crystals to be maintained in the concentrating solution at the point of overloading; and (c) removing from the overloaded concentrating solution the excess of seed crystal above the amount determined in step (b) above.

* * * * *